United States Patent [19]

O'Donnell

[11] Patent Number: 5,437,077
[45] Date of Patent: Aug. 1, 1995

[54] WINDSHIELD WIPER ASSEMBLY INCLUDING AN ARM AND PIVOTALLY MOUNTED BLADE

[76] Inventor: Lester R. O'Donnell, 5107 Lawrence Ave., Chillicothe, Ill. 61523

[21] Appl. No.: 210,493

[22] Filed: Mar. 21, 1994

[51] Int. Cl.6 .................................................. B60S 1/40
[52] U.S. Cl. ................. 15/250.33; 15/250.32; 15/250.22; 403/72
[58] Field of Search ........... 15/250.33, 250.32, 250.31, 15/250.21, 250.23, 250.22, 250.34, 250.35, 250.42; 403/72, 73, 113, 117, 119

[56] References Cited

U.S. PATENT DOCUMENTS

| | | | |
|---|---|---|---|
| 1,112,793 | 10/1914 | Heineman | 15/250.33 |
| 2,160,736 | 5/1939 | Horton | 15/250.33 |
| 2,270,589 | 1/1942 | Hansen | 15/250.32 |
| 3,440,678 | 4/1969 | Tibbet | 15/250.33 |
| 4,169,298 | 10/1979 | Smith | 15/250.33 |

FOREIGN PATENT DOCUMENTS

| | | | |
|---|---|---|---|
| 221954 | 9/1987 | Japan | 15/250.22 |
| 273961 | 12/1991 | Japan | 15/250.32 |
| 856162 | 12/1960 | United Kingdom | 15/250.33 |

*Primary Examiner*—Gary K. Graham
*Attorney, Agent, or Firm*—William J. Ruano

[57] ABSTRACT

A rotating window wiper arm having a pair of semi-cylindrical elements one of which being coaxially mounted on the distal portion of a windshield wiper arm and the other being attached to said windshield wiper functioning to provide an inexpensive and novel connection being adaptively utilized on old and new vehicles preventing wiper hopping and skipping across said windshield resulting in a clean wipe in both directions of movement.

1 Claim, 1 Drawing Sheet

WINDSHIELD WIPER ASSEMBLY INCLUDING AN ARM AND PIVOTALLY MOUNTED BLADE

BACKGROUND OF THE INVENTION

Present automobile windshield wipers chatter and skip across the windshield and wipe only in one direction on movement.

SUMMARY OF THE INVENTION

An object of the invention is to overcome the above-mentioned objections by providing an inexpensive and novel connection to be used on windshield wipers of new cars and one adapted to windshield wipers of old cars and which will not hop and skip across the windshield and which will provide a clean wipe in both directions of movement.

DESCRIPTION OF THE PREFERRED EMBODIMENTS

Figure 1:
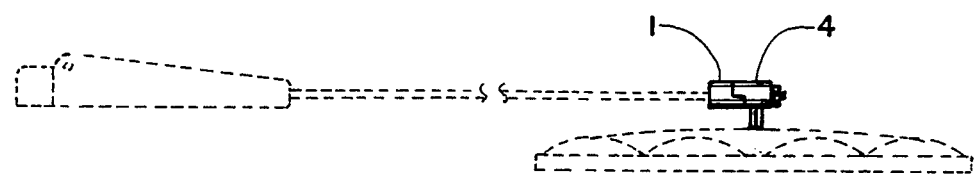
FIG. 1 shows a windshield wipe assembly with the original assembly dotted and the invention in solid lines, showing how the invention would be used on new cars.

FIG. 1 shows the fixed end of the novel connection 1,4 that is connected to the wiper arm by welding, which wiper arm is shown dotted.

Figure 2:
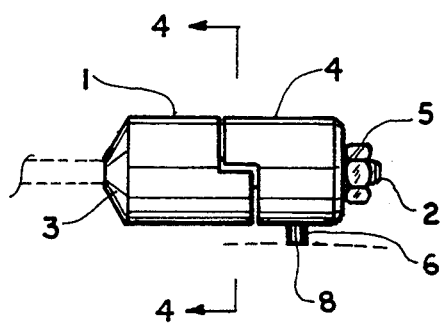
FIG. 2 shows an enlarged view of the invention.

FIG. 2 shows an enlargement of the novel connection in FIG. 1 comprising a small shaft 2 pressed into item 1 with a threaded end 2 to hold a nut 5. The shaft fits through item 4 and allows it to rotate a limited amount thereon.

Figure 3:
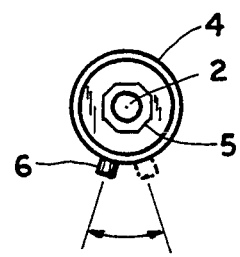
FIG. 3 shows an end view of the invention.

FIG. 3 shows a welded part of item 1 to fasten to the wiper arm.

Figure 4:
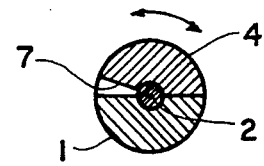
FIG. 4 shows a section at 4—4.
Figure 5:
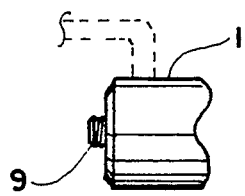
FIG. 5 shows how the invention would be connected to existing cars.

FIG. 4 shows a rotating part of the invention. This part will rotate about an eighth (⅛) of an inch, back and forth as the wiper arm goes back and forth. This will allow the wiper blade to angle with the windshield glass. A nut 5 holds the assembly together. A small peg 6 connects the invention to the wiper blade. A small chamfer (7) (FIG. 4) allows it to rotate about an eighth (⅛) of an inch. A hole in item 4 allows peg 6 to press fit into item 4. A small set screw 9 (FIG. 5) holds the unit 1-4 to the wiper arm on existing cars.

I claim:

1. A windshield wiper assembly comprising:
a rotatable windshield wiper arm having a free end,
a pair of elongated cylindrical elements defined by a first cylindrical element and a second cylindrical element, said fast cylindrical element being fixed to said rotatable windshield wiper arm and said second cylindrical element being rotatably mounted on said rotatable windshield wiper arm such that said fast cylindrical element and said second cylindrical element are relatively rotatable, said fast cylindrical element and said second cylindrical element being mounted at the free end of said windshield wiper arm and said second cylindrical element pivotally connecting a windshield wiper blade to said windshield wiper, each said cylindrical element having an axial projection extending longitudinally from an end thereof towards an end of the other cylindrical element, each of said projections including a surface thereon adapted to engage said surface of the other during relative rotation, said surfaces together defining rotation stop means for limiting relative rotation of said first cylindrical element and said second cylindrical element to less than 90 degrees.

* * * * *